(12) United States Patent
Thomas

(10) Patent No.: US 8,661,092 B2
(45) Date of Patent: Feb. 25, 2014

(54) SYSTEM AND METHOD FOR PROVIDING REAL-TIME DATA

(75) Inventor: Andrew Thomas, Mississauga (CA)

(73) Assignee: Real Innovations International LLC, Georgetown (CA)

( * ) Notice: Subject to any disclaimer, the term of this patent is extended or adjusted under 35 U.S.C. 154(b) by 312 days.

(21) Appl. No.: 12/905,319

(22) Filed: Oct. 15, 2010

(65) Prior Publication Data

US 2011/0093568 A1   Apr. 21, 2011

Related U.S. Application Data

(60) Provisional application No. 61/252,624, filed on Oct. 16, 2009.

(51) Int. Cl.
G06F 15/16 (2006.01)

(52) U.S. Cl.
USPC ........... 709/217; 709/203; 709/219; 709/227; 709/231

(58) Field of Classification Search
None
See application file for complete search history.

(56) References Cited

U.S. PATENT DOCUMENTS

| | | | |
|---|---|---|---|
| 6,944,827 B2 | 9/2005 | Gao et al. | |
| 7,162,534 B2 | 1/2007 | Schleiss et al. | |
| 2006/0101139 A1 | 5/2006 | Hornreich et al. | |
| 2006/0190563 A1 | 8/2006 | Vann | |
| 2006/0253539 A1 | 11/2006 | Casperson et al. | |
| 2007/0100844 A1 | 5/2007 | Buttner et al. | |
| 2009/0199112 A1* | 8/2009 | DeSerranno | 715/760 |
| 2010/0318200 A1* | 12/2010 | Foslien et al. | 700/83 |
| 2012/0185532 A1* | 7/2012 | Kristiansson et al. | 709/203 |

FOREIGN PATENT DOCUMENTS

CA    2707764 A1   12/2010

OTHER PUBLICATIONS

International Search Report for PCT/CA2010/001616, Feb. 28, 2011, 3 pages, ISA.
Written Opinion for PCT/CA2010/001616, Feb. 28, 2011, 4 pages, ISA.
Duhl, J., "Rich Internet Applications" IDC White Paper, Nov. 2003 [retrieved on Feb. 9, 2011]. Retrieved from the Internet: <URL: http://www.adobe.com/platformlwhitepapers/idc_impact_of_rias.pdt>.

(Continued)

Primary Examiner — Thomas Dailey
Assistant Examiner — Nam Tran
(74) Attorney, Agent, or Firm — Fitzpatrick, Cella, Harper & Scinto

(57) ABSTRACT

A system and method for providing real-time data to a Rich Internet Application is disclosed. The graphical and networking features of RIA frameworks in conjunction with at least one real-time data server provides low-latency, real-time data applications in a web browser. In one embodiment, data is produced at a data source, propagated to a server, and collected at the server. A persistent connection is created from a RIA to the server, and the RIA is subscribed to the data, wherein the subscribed data comprises at least some of the data collected at the server, and wherein the server propagates the subscribed data to the RIA through the persistent connection as the data is collected at the server.

19 Claims, 5 Drawing Sheets

(56) References Cited

OTHER PUBLICATIONS

Malik, S., "Implement a real-time server push in Ajax applications using socket-based RIA technologies" IBM Corporation, Sep. 22, 2009 [retrieved on Feb. 9, 2011]. Retrieved from the Internet: <URL: http://www.ibm.com/developerworks/web/library/wa-aj-socket!index.html>.

Häsel, M., "Rich Internet Architectures for Browser-Based Multiplayer Real-Time Games—Design and Implementation Issues of virtual-kicker.com", Proc. of the 1st Int'l Conferenc on Network-Based Info. Sys. (NBiS'07), pp. 157-166, Enokido, T., et al. (Eds.), Springer-Verlag, Berlin Heidelberg (Sep. 3, 2007).

Toffetti-Carughi, G., et al., "Modeling Distributed Events in Data-Intensive Rich Internet Applications", Proc. of WISE 2007, LNCS 4831, pp. 593-602, Benatallah, B. et al. (Eds.), Info. Sys. Eng'g, Springer-Verlag Berlin Heidelberg (Dec. 3, 2007).

\* cited by examiner

SYSTEM AND METHOD FOR PROVIDING REAL-TIME DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Real-time data refers to any digital or analog information that should be processed and/or transmitted within a certain amount of time after that data is originally created. The time elapsed from the moment that the data is created until it is processed and/or transmitted is known as latency. The maximum latency allowable for any particular real-time application is application-dependent. Applications where the maximum latency is a strict requirement can be referred to as "hard" real-time applications, while applications where the maximum latency is not a strict requirement can be referred to as "soft" real-time applications. Soft real-time applications need only satisfy an application-dependent, often subjective, measure of "fast enough". Non-real-time data is data that is not required to satisfy any particular latency requirement.

The term "data" may refer to hard real-time, soft real-time or non-real-time data. "Real-time data" may refer to hard real-time or soft real-time data.

Real-time data is typically generated due to a physical process or a computer program external to the computer system that processed the data. For example, real-time data may include: information from an industrial process control system such as motor status, fluid tank level, valve position, conveyor speed and so on; prices, volumes, etc. for financial instruments such as stocks; user interface events such as an indication that a user has clicked on a button on a computer display; data entry by a human operator; and computer operating system status changes. Virtually any information that is changing over time can be treated as real-time data.

An originator of data may be described as a "data source". For example, data may originate as a physical process, measured electrically, and converted to a digital representation, or data may originate in a digital representation. Generally, data is made available in a digital computer as a digital representation, following zero or more steps to convert the data into a digital representation. A data source may comprise all of the components and steps necessary to convert the data to a digital form accessible by a computer program.

Analogous to a data source is a "data sink". A data sink consumes, or uses, data. Some examples of data sinks are: actuators in a process control system; trade processing software in a stock trading system; a user interface application; a database or other data storage system.

Many data sources are also data sinks. Accordingly, a data source may comprise a data source, a data sink, or both simultaneously. For example, when data is transmitted to a data source, the data source may also act as a data sink.

In computer applications, data is commonly managed by a "server". The server can act as either a data source or a data sink, or both together, allowing "client" applications to interact with the data that the server manages.

Generally, a client application must initiate a connection with a server in order to interact with data. That connection can be "short-lived", where the connection exists only for the duration of a single or few interactions with the data, or "long-lived", where the connection persists for many interactions with the data, and possibly for the duration of the client application's lifetime. Long-lived connections are also referred to as "persistent" connections.

Data sources provide data in one or more "data formats" that define the digital representation of the data. The data format may conform to a published standard or be particular to the data source. Similarly, data sinks may require data in a published standard format or in a format particular to the data sink.

Data sources provide access to data through one or more "transmission protocols". A transmission protocol specifies the mechanism by which data are transferred from a data source to a data sink. A transmission protocol may conform to a published standard or be particular to the data source. A data source may combine data formats and transmission protocols such that not all supported data formats can be transmitted via all supported transmission protocols. Generally, a "protocol" or "data protocol" refers to the combination of a particular data format transmitted via a particular transmission protocol.

A data sink must support at least one data protocol offered by a data source in order to use the data generated by the data source. Since a large number of data protocols exist, it is impractical for all data sources and data sinks to support all data protocols. As a result, client applications that make use of data are usually created only to support the most necessary protocols for their primary purpose. Similarly, data sources generally support only those protocols that are necessary for their primary purpose. So, for example, there is no way to directly connect a web browser that supports the HTTP protocol to a spreadsheet application that supports the DDE protocol.

A protocol conversion step must be performed to convert data from a protocol supported by a data source into a protocol supported by a data sink in order for the data sink to make use of the data offered by the data source. This conversion step can be performed by a "middleware" application. A primary purpose of a middleware application may be to facilitate communication between a data source and a data sink, usually by converting data from one protocol to another such that data sources and data sinks can interact indirectly when they share no protocol in common.

A data source may transfer data to a data sink using at least two methods:

1) On demand: the data source passively waits for a data sink to request some or all of the data available in the data source. When the data sink makes a request for data, the source responds with a result indicating the current state of the requested data. If the data sink needs to be informed of changes to the data, the data sink must repeat the request in order for the data source to respond with the updated data. This repeated request for the same data by the data sink is known as "polling". A data sink may create either a short-lived connection to the data source for each new request, or a persistent connection over which many repeated requests are transmitted.

2) By subscription: the data sink creates a persistent connection to the data source, and subscribes to some or all of the data available from the data source. The data source transmits any changes to the data via the persistent connection as those changes occur. The data source will continue to send changes to the data until the data sink specifies otherwise or the connection is closed.

It is understood that data transfer methods such as shared memory, message queues and mailboxes are variations on either the demand or subscription methods. It is also understood that the terms data transfer, data propagation, or data transmission all refer to the movement of data within a system, and these terms may be used interchangeably, as they relate to the specific data transfer method. It is further understood that these methods are independent of the underlying transmission protocol.

Computer applications dealing with real-time data must be reliable, responsive and easily connected to their data sources. This has meant that real-time data processing applications have historically been created as stand-alone applications connected directly or indirectly to the data source. This stand-alone architecture has also allowed the applications to take full advantage of the graphical capabilities of the computer to provide rich dynamic visualization of the real-time data. By contrast, applications based on web browser technology have proven unsuitable in terms of data connectivity and graphical speed. Consequently, widespread real-time data processing and display in a web browser has been unavailable. Some developer efforts have provided access to data driven displays using ActiveX components in a web browser, but these components are generally poorly supported by modern browsers and subject to limitations due to the security risks that they represent.

Efforts have been made to display changing data in a web browser using the built-in Javascript engine of the browser. This is generally achieved using a methodology called AJAX (Asynchronous Javascript and XML), where the web browser polls periodically for new data and then updates its display accordingly. This polling mechanism is highly inefficient, and suitable only for relatively small data sets or for relatively slow-moving data. Lowering the polling rate to conserve CPU or network bandwidth has the effect of raising data latency, which is unacceptable for real-time applications.

Efforts to improve on AJAX, through a mechanism called Streaming AJAX take advantage of a side-effect of the browser page loading mechanism to cause a browser page to grow incrementally by adding Javascript commands to the page over time. Each Javascript command executes as it arrives, giving the impression of a continuous data stream. The web browser is effectively fooled into thinking that it is loading a very large web page over a slow network connection. This method has several drawbacks, including the fact that the web browser's memory and CPU usage can grow continuously over time due to the ever-larger page that is being transmitted.

Both AJAX and streaming AJAX methods suffer from a lack of quality display options within the web browser. Web browsers are generally designed for the display of static pages and web "forms", and do not offer high-speed or high quality graphic presentation options. Efforts to improve upon graphical display options have tended to be incompatible among web browsers, and generally very slow to execute.

All data transmission solutions based on built-in web browser capability are primarily targeted at receiving data in the web browser. The communication of data is uni-directional, in that the connection that receives data from a server cannot also be used to transmit data to the server. If the web browser needs to transmit data back to the server, it must do so by opening a new connection, transmitting an HTTP request, and then closing the connection again. Consequently, solutions such as Streaming AJAX are very slow to transmit data back to the data server, because of the large overheads and latencies incurred by having to emit a new HTTP request for every data transmission.

Some efforts at web-based data visualization attempt to improve the user experience by presenting slow-moving (high latency) data as if it were faster. This is achieved by displaying interpolated data in the web browser at higher frequency than the data is actually arriving. For example, a circular gauge representing a speedometer might receive the values 1 and 100, separated in time by 5 seconds. The web page could then draw the gauge dial 5 times per second, changing the value by 4 each time. This would give the viewer an impression of a smoothly changing speed, even thought the underlying data delivery contains no such information. That is, such a display of interpolated data can be entirely misleading to the viewer. This kind of interpolation obscures the true behaviour of the underlying data, and is usually unacceptable in real-time applications such as process control and stock-market trading.

Rich Internet Application ("RIA") frameworks such as Adobe Flash™ and Microsoft Silverlight™ offer improved platforms for both data processing and graphical display within a web browser. These RIA frameworks also support direct TCP/IP communications within the RIA. Surprisingly, the combination of these features makes it possible to process and display real-time information in a web browser. This processing and display capability has not been translated into real-time data systems due to a perception in the software industry that RIAs are suited primarily to video, advertising and games.

SUMMARY OF THE INVENTION

The present invention provides a system and method for use of the graphical and networking features of RIA frameworks in conjunction with at least one real-time data server to provide low-latency, real-time data applications in a web browser. The invention overcomes the limitations of current AJAX and streaming AJAX while simultaneously dealing with data sources whose data is not usable within a web browser.

The invention improves upon the state of the art in real-time data delivery to web browsers by reducing the data latency to a point where visualization components can be animated using true data values, rather than interpolated values. This allows short-lived behaviour in the data to be more accurately presented to the user. Short-lived data behaviour is commonly important in understanding the true dynamics of the real-time system represented by that data. For example, a person watching a physical gauge can discern important system properties by watching vibration or overshoot in the gauge needle behaviour. In one embodiment of the invention, a digital representation of the physical gauge can capture the needle dynamics and provide the same high-quality information as the physical gauge.

The invention vastly improves the speed of data transmission from the user to the data server, reducing CPU and network costs and reducing latency. This allows the user to participate in more sophisticated control scenarios where system responsiveness is important to correct behaviour. For example, the system may require a hold-and-release interaction while filling a vessel with water. The user would press a button and hold it until the vessel is full, then release the button. Clearly, the system must respond rapidly in order to avoid over-filling the vessel. This type of control is not possible in typical web-based applications due to the unpredictability of the data delivery latency. Surprisingly, the invention makes possible classes of control and real-time data applications that were previously too slow, unreliable or primitive to be contemplated through a web browser.

Typical web applications deal with data provided in a specific format by the application designer. This may be an intentional method for limiting the end-user choice, or simply a limitation on the design. Even where the data format follows an industry standard (such as XML or JSON), the data source is specific to the application. The invention also provides a general purpose mechanism for delivering a wide variety of real-time data originating from both industry-standard and proprietary sources. Advantageously, the invention can further provide that data in a variety of data formats.

Many sources of data, both real-time and non-real-time, are not intended for network use (i.e., transmission over a network). The present invention allows data from these data sources, such as Microsoft Excel™ (Microsoft Corp.), to be reliably and rapidly delivered to any RIA or web-based application over a network. Some data sources, such as those based on OPC, were intended for network use but are not designed for communication with a web browser. The invention allows these sources to also be delivered reliably and rapidly to a web-based application. Other data sources, such as database systems, provide no interface at all for real-time information. The invention allows non-real-time data from sources such as database applications to be delivered as if it were real-time, thereby eliminating the need for a RIA or web-based application to perform very inefficient polling of the database.

Data sources and data sinks may connect to the server via persistent connections or short-lived connections. It is understood that the connection method to the server will reflect the requirements of the particular data source or sink.

The invention provides a method by which real-time data from one or more data sources is efficiently made available to a Rich Internet Application. The invention further provides a method for the RIA to efficiently modify the real-time data or generate new real-time data that can be transmitted back to the data source or sources. The data source or sources can then retransmit that data to other RIAs on the network. The invention thus effectively allows any number of RIA applications to communicate with one another in real time, and to jointly communicate with one or many real-time data sources. The invention allows for the abstraction of real-time data such that any data that can be represented using the abstraction can be made available to the RIA, regardless of its original source, representation or transfer protocol.

DETAILED DESCRIPTION OF THE INVENTION

Figure 1:
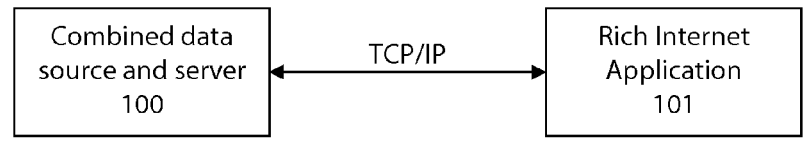
FIG. 1 is an exemplary block diagram illustrating a direct connection between a RIA and a data server, in accordance with one embodiment of the present invention.

The following description is presented to enable any person skilled in the art to make and use the invention, and is provided in the context of particular applications of the invention. Various modifications to the disclosed embodiments will be readily apparent to those skilled in the art, and the general principles defined herein may be applied to other embodiments and applications without departing from the scope of the present invention. Reference to various embodiments and examples does not limit the scope of the invention, which is limited only by the scope of the claims attached hereto. Additionally, any examples set forth in this specification are not intended to be limiting and merely set forth some of the many possible embodiments for the claimed invention.

The program environment in which a present embodiment of the invention is executed illustratively incorporates a general-purpose computer or a special purpose device such as a hand-held computer or telephone. Details of such devices (e.g., processor, memory, data storage, display) may be omitted for the sake of clarity.

It is also understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In reference to the example embodiments shown in the figures, it is understood that simplified examples were chosen for clarity. Single instances of an element (e.g. a RIA, a server, a data source, a data sink, etc.) appearing in the figures may be substituted for a plurality of the same element, and still fall within the scope of the present invention.

Accordingly, in one aspect, the present invention provides a method of providing real-time data to a RIA, the method comprising: producing data at a data source; propagating the data to a server; collecting the data at the server; creating a persistent connection from the RIA to the server; and subscribing the RIA to subscribed data, wherein the subscribed data comprises at least some of the data collected at the server, wherein the server propagates the subscribed data to the RIA through the persistent connection as the data is collected at the server. The method may further comprise sending RIA-originated data to the server. The RIA-originated data may contain at least one change request to the data through the persistent connection. Further, the data may be propagated through at least one intermediate component. The server may receive the at least one change request and transmit the at least one change request to the data source. The at least one change request may be transmitted through the intermediate component. The intermediate component may be an intermediate hardware component or an intermediate software component. Optionally, the RIA may subscribe to the subscribed data. Producing data at the data source and propagating the data to the server may be concurrent with collecting the data at the server. The RIA may perform an action based upon the data, such as a calculation or a modification of a graphical representation. The RIA may provide a visual representation of the data on a user display, and a user may interact with the visual representation to generate RIA-originated data. The visual representation may be a program running within a RIA framework. The RIA-originated data may instruct the server to perform an action, such as to shut down the server, or to alter its behaviour, such as to alter which data arrives from the server.

For example, RIA-originated data may be as a result of user interaction, a timer event, a response to a data change coming from the server, a script, or another non-user generated event.

In another aspect, the present invention provides a method of providing real-time data to a RIA, the method comprising: providing data from a data source; propagating data from the data source to a server; collecting data at the server; producing data at the RIA; creating a first persistent connection from the server to the RIA; creating a second persistent connection from the RIA to the server; propagating data from the RIA to the server through the second persistent connection; and subscribing the RIA to subscribed data, wherein the subscribed data comprises at least some of the data collected at the server, and wherein the server propagates the subscribed data to the RIA through the first persistent connection. The method may further comprise propagating data from the server to a data sink. The first persistent connection and the second persistent connection may consist of a single connection. The data source, data sink and server may consist of a single component, or any combination of two components. The data may be propagated though at least one intermediate selected from the group comprising: a software component, a hardware component, and a network.

A data item may be propagated between the RIA and the server on a subscription basis, wherein the data item is propagated immediately in response to a change in the data item. The propagated data may be selected from the group comprising: numeric data, non-numeric data, configuration settings and executable commands. The RIA may perform an action based upon the data, where the action is selected from the group comprising: a modification of a visual representation of a user display, a calculation, production of new data, modification of existing data, storage of data, an audible indication, execution of a script, propagation of data to the server, a user-visible programmatic response, and a non-user-visible programmatic response. Data produced at the RIA may instructs the server to perform an action selected from the group comprising: modification of data within the server, propagation of the data to data sinks connected to the server, execution of a script, storage of the data to a file system, creation of new data, propagation of new data to data sinks connected to the server, modification of a server configuration, modification of a server behaviour, a user-visible programmatic response, and a non-user-visible programmatic response.

In yet another aspect, the present invention provides a computer readable storage medium storing instructions that, when executed on one or more computers, causes the computers to perform methods of providing real-time data to a RIA as described above.

In another aspect, the present invention provides a system for providing real-time data to a RIA, the system comprising: at least one data source; at least one server comprising: a data collection component for collecting data from the at least one data source; and a data emission component for emitting data to at least one data client; at least one RIA; and optionally at least one data sink. The server may further comprise a data modification component for modifying the form of the data collected by the data collection component for emission by the data emission component. It is understood that the at least one data source and at least one server may be implemented in at least one computer program (i.e. a single computer program, or two or more separate computer programs).

The server may further comprise one or more components selected from: a data modification component; a data creation component; a user interface component; a computer file system interaction component; a program interaction component for interacting with other programs running on a computer running the server; a scripting language component to perform programmable actions; a HTTP component for accepting HTTP requests from client programs and respond with documents as specified by those requests, in a manner analogous to a "web server", including the ability to dynamically construct the document in response to the request, and to include within the document the current values of the data resident in the server and the results of executing statements in the server's built-in scripting language; a synchronization component to exchange and synchronize data with another running instance of the server on any local or network-accessible computer, such that both servers maintain essentially identical copies of that data, thereby enabling client applications connected to either instance of the server to interact with the same data set; a first throttling component to limit the rate at which data is collected; a second throttling component to limit the rate at which data is emitted; a connectivity component to detect a loss of connectivity to other servers, and to reconnect to the other servers when connectivity is regained; a redundancy component to redundantly connect to multiple other servers of identical or similar information such that data from any of the other servers may be collected in the event that one or more of the other servers is inaccessible; and a bridging component to "bridge" data among sources of data such that some or all of the data within those sources will maintain similar values with one another, or bridge data among data sources including a mathematical transformation such that the data in one source is maintained as the mathematical transformation of the data in the other source, including the ability to apply the mathematical transformation in both the forward and inverse directions through a bi-direction bridging operation. It is understood that this set of server components could be extended by adding additional functionality to the server to support other data collection and transmission mechanisms, other processing mechanisms and other storage mechanisms.

The data collection component may collect data in one or more of the following manners: on demand, wherein the server sends a request for some or all of the data resident in another server, and that other sever responds with the current value or values of the requested data only once in response to the request; by subscription, wherein the server sends a request for a subscription to some or all of the data resident in another server, and the other server responds by sending the current value or values of its data, and then continues to send any subsequent changes to the value or values of the data until the server either terminates its connection to the other server, or requests that the other server cease sending updates; on a trigger, wherein a client, script or human (a "user") configures the server to collect the data only if a certain trigger condition is met, be that a timer, a time of day, a data change, a change in the system status, a user action or some other detectable event; and passively by waiting for a "client" application to send data to the server.

The data emission component may emit data in one or more of the following manners: on demand, wherein a "client" application sends a request for some or all of the data, and the sever responds with the current value or values of the requested data only once in response to the request; by subscription, wherein a client application sends a request for a subscription to some or all of the data, and the server responds by sending the current value or values of the data, and then continues to send any subsequent changes to the value or values of the data until the client either terminates its connection to the server, or requests that the server cease sending updates; and on a trigger, wherein a client, script or human (a "user") configures the server to emit the data only if a certain trigger condition is met, be that a timer, a time of day, a data change, a change in the system status, a user action or some other detectable event.

The data collected at the data collection component may be received using one or more transmission protocols selected from: Dynamic Data Exchange (DDE), OLE for Process Control (OPC), OPC Alarm and Event specification (OPC A&E), OPC Unified Architecture (OPC-UA), OPC Express Interface (OPC-Xi), TCP/IP, SSL (Secure Socket Layer) over TCP/IP through a custom interface, Hypertext Transfer Protocol (HTTP), Secure HTTP (HTTPS), Open Database Connectivity (ODBC), Microsoft Real-Time Data specification (RTD), Message queues, Windows Communication Foundation (WCF), industrial bus protocols such as Profibus and Modbus, Windows System Performance Counters, TCP/IP communication from embedded systems, TCP/IP communication from non-MS-Windows systems, TCP/IP communication from Linux, TCP/IP communication from QNX, TCP/IP communication from TRON, TCP/IP communication from any system offering a C compiler and TCP implementation, Scripts written using a built-in scripting language, data entered by humans through a user interface, data read from a local disk file, data read from a remotely accessible disk file, proprietary formats, user-defined formats, and formats added through extensions to the server. An example of a proprietary format is Wonderware SuiteLink™.

The data emitted from the data emission component may be transmitted using one or more transmission protocols selected from: Dynamic Data Exchange (DDE), OLE for Process Control (OPC), OPC Alarm and Event specification (OPC A&E), OPC Unified Architecture (OPC-UA), OPC Express Interface (OPC-Xi), TCP/IP, SSL (Secure Socket Layer) over TCP/IP through a custom interface, Hypertext Transfer Protocol (HTTP), Secure HTTP (HTTPS), Open Database Connectivity (ODBC), Microsoft Real-Time Data specification (RTD), Message queues, Windows Communication Foundation (WCF), industrial bus protocols such as Profibus and Modbus, TCP/IP communication to embedded systems, TCP/IP communication to non-MS-Windows systems, data presented to humans through a user interface, data written to a local disk file, data written to a remotely accessible disk file, proprietary formats, user-defined formats, formats added through extensions to the server, electronic mail (E-Mail), and Short Message Service (SMS) message format.

Further, the data collected at the data collection component may be in a format appropriate to the transmission protocol. The data emitted from the data emission component may be in a format appropriate to the transmission protocol. The data collected at the data collection component and the data emitted from the data emission component may also be in a format selected from: parenthetical expression (LISP-like) format, Hypertext Markup Language (HTML), eXtensible Markup Language (XML), JavaScript Object Notation (JSON), proprietary binary format, user-definable text format, and a format added through extension of the server.

The system may further comprise an Application Programming Interface (API) that implements a TCP/IP connection and one or more of the data formats supported by the server, which may assist a programmer in establishing a connection as described above. The API may be implemented for one or more of the following platforms: "C" programming language, "C++" programming language, Microsoft .Net programming environment, Microsoft Silverlight RIA framework, Adobe Flash RIA framework, Adobe Air RIA framework, a programming language supporting TCP/IP communication (including any scripting language), and a RIA framework supporting TCP/IP communication.

The RIA may be implemented using a RIA framework selected from: Microsoft Silverlight, Adobe Air, and a RIA framework supporting TCP/IP communication. The RIA framework may comprise support for: making a first long-lived TCP/IP data connection to the server to receive data; receiving data from the server; and transmitting data to the server over a second TCP/IP data connection. The data may be received from the server on demand or by subscription. The first TCP/IP data connection and the second TCP/IP data connection may be the same connection. The second TCP/IP data connection may be a long-lived connection. The second TCP/IP data connection may be a short-lived connection. The TCP/IP data connection to the server may be in a protocol selected from: an API, as described above, a direct TCP/IP connection, HTTP, and HTTPS.

Data from the server may be received, or data to the server may be transmitted, in one or more form selected from: a parenthetical expression (LISP-like) format, Hypertext Markup Language (HTML), eXtensible Markup Language (XML), JavaScript Object Notation (JSON), a proprietary binary format, a user definable format, and a format added by extension to the server.

The RIA framework may further comprise support for presenting a graphical display representing the data to a user. The graphical display may comprise one or more graphical elements selected from: a textual display, a slider, a chart, a trend graph, a circular gauge, a linear gauge, a button, a check box, a radio button, a progress bar, a primitive graphical object, controls supported by the RIA framework, custom controls created to extend the RIA framework, third-party controls implemented using the RIA framework, and a customized graphical element.

Configuration information of the graphical display may be saved on the server, as well as loaded from the server. A graphical element may be created and modified within the graphical display. The graphical element may be a customized graphical element, customizable by a user, wherein the customization may be saved on the server. Customization may be performed by a programmer, without requiring modification to an application implemented in the RIA framework. The customized graphical element may be available for use to a user in other graphical displays. These customizations may be for creating new displays, modifying existing displays, all in addition to the graphical elements originally supported by the user interface application. The graphical element may comprise one or more property that is user-modifiable, and which may be selectable by a programmer. User interaction with the graphical element may cause a user interface application to emit modifications to the data to the server. A user-only mode may be provided to disallow creation or modification of the graphical display by a user, and a read-only mode may also be provided to disallow interaction with the graphical element by the user. A system administrator may select which user and for which graphical display a user interface application will operate in one of the user-only mode and read-only mode. The user may be required to identify himself, and where such identification is required, the user interface application may operate in at least one of the user-only mode and the read-only mode. Advantageously, the features of the invention allow modification of the graphical displays through any user RIA terminal and the resulting changes, upon saving, are immediately available to all other RIA terminals connected to the server.

Referring to FIG. 1, in one embodiment, RIA 101 makes a data connection directly to a program that is acting as both data source and data server 100. This could occur where the data source is both a collector of raw data and a transmitter via a TCP/IP protocol. An example of this would be an OPC-UA server embedded within a PLC. Another example would be an embedded device that acts as a data source and provides a TCP/IP server capability offering a custom TCP/IP interface. Yet another example would be a stock market data feed that offers a TCP/IP interface.

Figure 2:
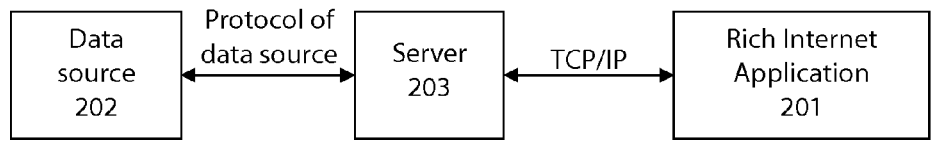
FIG. 2 is an exemplary block diagram illustrating a connection between a RIA, a server, and a separate data source, in accordance with one embodiment of the invention.

Referring to FIG. 2, in one embodiment, another configuration comprises a separate data source 202 and server 203. This configuration extends the communication model by converting the data protocol of data source 202 into a TCP/IP protocol that can be processed by RIA 201. This greatly broadens the number and type of data sources 202 by allowing the server 203 to interact with data sources 202 that do not provide a TCP/IP interface directly.

Figure 3:
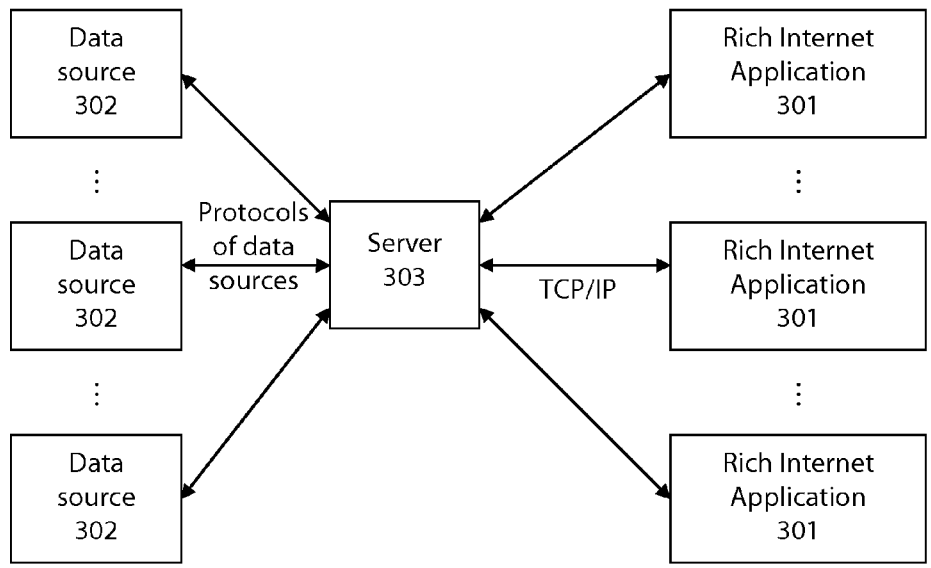
FIG. 3 is an exemplary block diagram illustrating connections between multiple RIAs, a server, and multiple, separate data sources, in accordance with one embodiment of the invention.

Referring to FIG. 3, in one embodiment, server 303 may manage connections to more than one data source 302 and to more than one RIA 301 simultaneously. This more complex configuration performs aggregation of data from data sources 302 and RIAs 301 into a single data set that is accessible from anywhere on the TCP/IP network.

In another embodiment, a system may include multiple servers, interconnected with one or more data sources and/or one or more RIAs.

Figure 4:
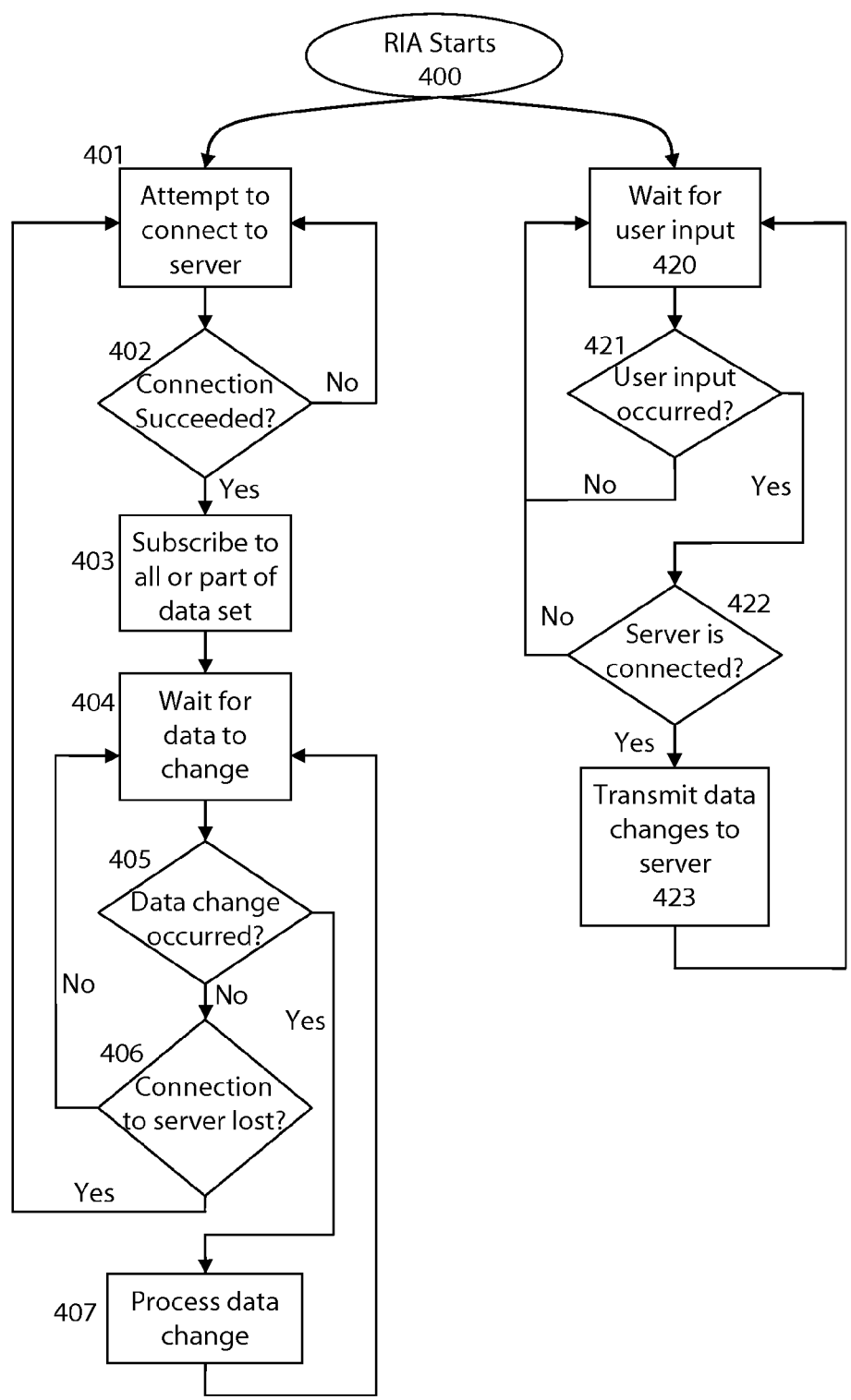
FIG. 4 is an exemplary flowchart illustrating one method of RIA control flow, in accordance with one embodiment of the invention.

Referring to FIG. 4, in one embodiment, a method of RIA behaviour and control flow is shown. The RIA does not require an explicit stopping criterion, though one or more may be incorporated. The RIA is stopped implicitly when a user closes the web browser or page containing the RIA. The RIA simultaneously follows two flows of control, which can be either interleaved in a single program thread or implemented in separate program threads. The method may comprise additional processing specific to the RIA.

In the first flow of control, the RIA starts (Step 400) by attempting to establish and maintain a connection to a server, and to respond to changes in the data available from the server. The RIA first attempts to establish a connection (Step 401). If the connection is not successful, it simply re-tries that connection indefinitely. If the connection succeeds (Step 402) then the RIA may subscribe to all or part of the data set (Step 403). Alternatively, it is possible for the server to implicitly subscribe the RIA to the data set based on the presence of a connection, in which case Step 403 may be skipped. In addition to a subscription, the RIA may also transmit other information to the server to configure the behaviour of the data transmission, such as a minimum time between updates or timeout parameters on the connection.

Having once established a connection, the RIA waits for notifications of a change in data from the server (Step 404). If a data change has occurred (Step 405) then the RIA processes that data in some fashion (Step 407). This processing may be to modify an internal state of the RIA, modify a graphical representation, play a sound or any other programmatic response that the RIA designer determines. If no data change occurs, the RIA checks to determine if the connection to the server has been lost for any reason. If the connection has not been lost, the RIA returns to wait for a data change to occur (Step 404). If the connection has been lost then the RIA re-tries the connection to the server (Step 401).

Simultaneously with Steps 401 through 407, the RIA may also accept user input, allowing the user to generate changes in the data that can be propagated back to the server. The RIA waits for user input (Step 420) either in a separate program thread or multiplexed with Steps 401 through 407.

FIG. 4 exemplifies a separately threaded method. If user input has occurred (Step 421) then the RIA can attempt to transmit the resulting data to the server. It does this by first checking to see if the server is connected (Step 422). If so, the RIA transmits the new data to the server (Step 423). If not, the RIA waits for more input (Step 420). The check for the server connection (Step 422) may be implicit in the attempt to transmit the data, in which case Steps 422 and 423 are combined in practice.

The RIA may also be non-interactive such that user input is not accepted, in which case Steps 420 to 423 can be omitted.

Figure 5A:
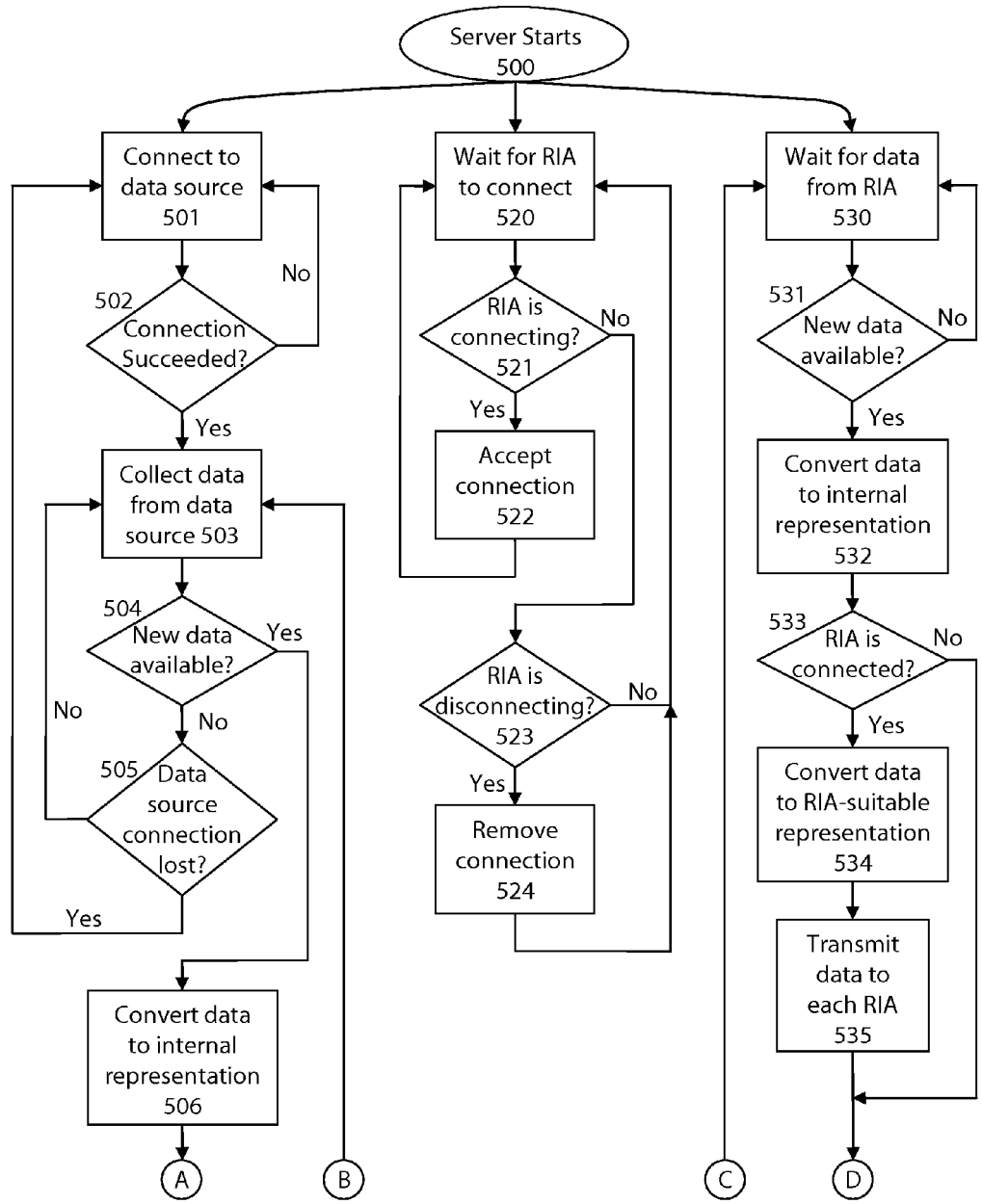
FIG. 5a, b is an exemplary flowchart illustrating one method of operation of a server, in accordance with one embodiment of the invention.
Figure 5B:
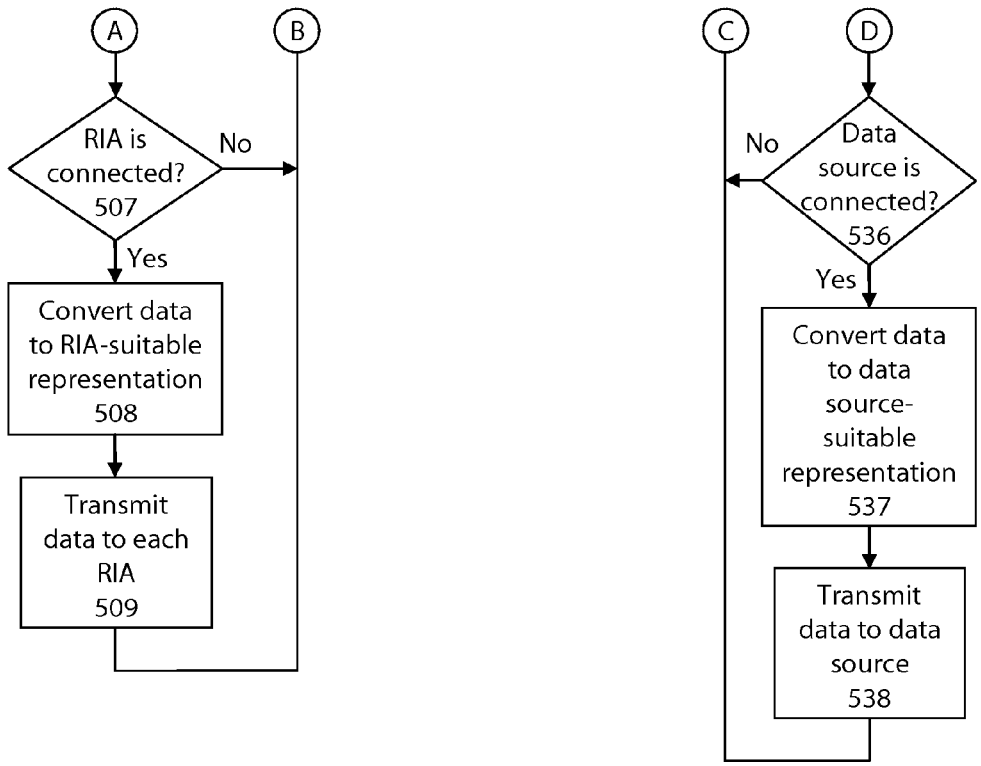

Referring to FIG. 5, in one embodiment, the method of operation of a data server is shown. The server may be simultaneously collecting data from zero or more data sources while serving data to zero or more RIA connections. The two main flows of control can be implemented in separate threads, or by interleaving the two flow control paths within a single thread.

In order to interact with a data source, the server must start (Step 500) by first establishing a connection to that data source (Step 501). Normally, the server initiates this connection to the data source. In some cases, the data source may initiate the connection to the server. If the connection succeeds (Step 502), the server begins collecting data from the data source (Step 503). If the connection fails, the server re-tries the connection to the data source (Step 501). If the data source is the initiator of the connection to the server, then Steps 501 and 502 collapse to a single wait state and the server passively waits for the data source to connect. The data collection (Step 503) will follow a method appropriate to the data source, and may differ from one data source to another. The server can be made to accommodate any data source whose data can be represented in the server. If new data becomes available from the data source (Step 504), the server converts that data to the server's internal data representation. This allows the server to aggregate data from a variety of data sources using different data representations. Step 506 can be omitted in the simple case where the data source, server and RIA all use the same data representation. The server then attempts to transmit the data to each RIA. The server may first establish that a RIA is connected (Step 507). If one or more RIA is connected, the server converts the data to a representation suitable for the RIA (Step 508) and transmits that data to each connected RIA (Step 509). If no RIA is connected, the server continues collecting data from the data source (Step 503). The server repeats this sequence (Steps 501-509) indefinitely. The server may choose not to collect data from a data source when no data sink is connected to the server that requires data from that data source.

Simultaneous with, or interleaved with, collecting data from the data source, the server also manages connections from RIAs. The server waits for a connection from an RIA (Step 520). When an RIA attempts to connect to the server (Step 521) the server accepts the connection (Step 522) and continues to wait for connections from other RIAs. While waiting for an RIA to connect, the server must also determine whether an existing RIA connection has disconnected (Step 523). If an RIA has disconnected, the RIA connection is removed from any tracking in the server (Step 524) so that no attempt is made in future to transmit data (Step 509) to the disconnected RIA. The server repeats this sequence (Steps 520-524) indefinitely. The server may apply acceptance criteria when the RIA attempts to connect (Step 522) such that the server may refuse the connection for any reason, such as an authentication failure or a server-applied limit on the maximum number of concurrent connections from RIA instances.

Simultaneously with, or interleaved with, collecting data from the data source and managing new connections from RIAs, the server may also receive data from RIAs already connected. The server waits for data to arrive from the RIA (Step 530). When new data arrives (Step 531), the server converts this data into the server's internal data format (Step 532). The server then determines if any RIA is currently connected (Step 533). The server then converts the data to a format suitable for receipt by the RIA (Step 534) and transmits the data to each currently connected RIA (Step 535). The server then determines if any data source that requires this change of information is currently connected (Step 536). For each data source requiring the information that is currently connected to the server, the server converts the data to a format suitable for that data source (Step 537) and transmits the data (Step 538). The server repeats this sequence (Steps 530-538) indefinitely.

Steps 501 through 509 can be replicated repeatedly for each data source to which the server may connect.

Steps 520 through 524 can be replicated repeatedly for each RIA from which the server may receive a connection.

Steps 530 through 538 may be replicated for each connected RIA, or may be multiplexed such that Step 530 waits simultaneously for all connected RIAs at once, or any combination of these options.

It is understood that the methods exemplified in FIG. 4 and FIG. 5 may be modified to include additional capabilities, including: explicit stopping conditions for both the RIA and the data server; the ability of the server to wait passively for a data source to connect to the server; the ability of the server to actively connect to the RIA; the ability of the server to simultaneously manage connections to multiple data sources; the ability of the server to simultaneously manage connections to multiple RIAs; and the ability of the server to simultaneously receive data from multiple RIAs.

Figure 6:
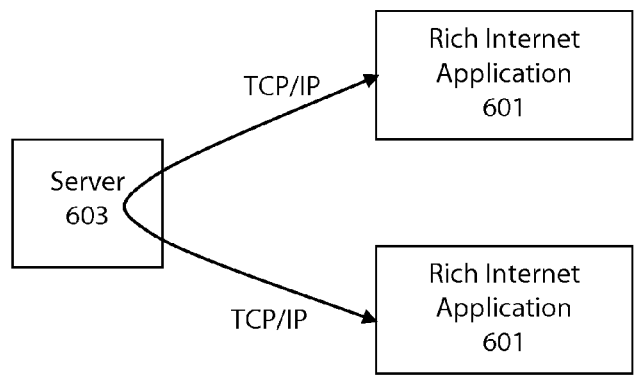
FIG. 6 is an exemplary block diagram illustrating a data server managing simultaneous connections to multiple RIAs, in accordance with one embodiment of the invention.

Referring to FIG. 6, in one embodiment, the data server's 603 ability to simultaneously manage connections to multiple RIAs 601 advantageously allows for RIAs 601 to communicate among one another through the server. Any information transmitted from RIA 601 to server 603 will be treated by the server as if the RIA 601 is a data source, and will propagate that data to any other RIAs 601 that are connected to the server and have subscribed to that data. Surprisingly, this effectively creates a network of RIAs intercommunicating in real time. In fact, server 603 may be used to enable communication among any number of client applications, using any combination of protocols that the server supports.

Figure 7:
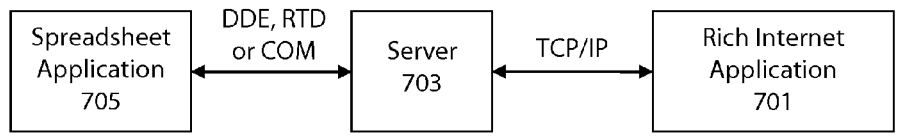
FIG. 7 is an exemplary block diagram illustrating real-time transmission of data via a local or wide area network between a spreadsheet application and a RIA, in accordance with one embodiment of the invention.

Referring to FIG. 7, in one embodiment, a substantial benefit of this invention is the ability to present data in RIA 701 that originates from sources that cannot otherwise be accessed via a network. In this embodiment, data originating in spreadsheet application 705, such as Microsoft Excel, may be transmitted via a local or wide area network, which was not possible prior to the present invention. Data transmission from Microsoft Excel is limited to DDE, RTD or ad-hoc communication through fragile scripts. No protocol supplied by Microsoft Excel, including DDE, RTD and ad-hoc communication through scripts, enables real-time communication with a RIA. The invention allows any application to communicate in real time with the spreadsheet data over any TCP/IP network, vastly broadening the scope of applications for spreadsheet data. The combination of this communication ability with RIA 701 offers the ability to have multiple simultaneous users interacting with a single spreadsheet through a simple web browser connection. This same functionality extends to any protocol that server 703 supports.

When running a RIA within a web browser, the RIA must be served to a web browser using a web server. That is, the user enters a URL into a web browser, or clicks a link within a web page for that URL, causing the web browser to load a web page containing the RIA. The URL is serviced by a web server such as Microsoft IIS™ or Apache'. The sequence of events when loading and connecting the RIA is thus:

1. The user selects a URL in the web browser
2. The web browser loads the page containing the RIA from the web server
3. The web browser starts the RIA
4. The RIA connects to the data server via TCP/IP
5. The RIA subscribes to data in the data server
6. The data server begins transmitting data according to the subscription
7. Data service continues until the RIA disconnects or is otherwise stopped This sequence requires that a web server be present and configured to serve the RIA. It may be convenient to embed the web server capability within the data server to reduce the number of system components and to more tightly integrate the web functions with the data functions of the RIA.

It will be readily apparent to those skilled in the art that the RIA may be executed from an embedded browser or a separate non-browser host (sometimes referred to as an out-of-browser mode for the RIA) to launch a RIA session. The URL and web browser may not be evident to the user. Accordingly, the first three steps in the sequence of events above may be modified to reflect these alternate embodiments.

In the present invention, a RIA may be any application written using a RIA framework that is capable of using or generating data.

In one embodiment, the RIA displays real-time data visually to a user. The visual components may be gauges, trend graphs, progress bars, buttons, images and other visual representations common in desktop applications. Since there is a wide variety of possible representations, and the most suitable representation for a particular data set will differ from the most suitable representation for another data set, the RIA should be user-configurable. This means that the user may be presented with a visual configuration tool that allows him to associate data with visual "objects". A collection of these visual objects can be arranged together into a visual "page" commonly used to display related information. The user could then create multiple pages to display different sets of related information.

In order to provide to the user the ability to customize the data visualization, the RIA must provide either integrated or separate customization functionality, more commonly referred to as an editor. This editor provides a means by which the user specifies the visual design of pages displaying the real-time data. The editor may also provide the ability to design specialized versions of visual objects.

The information regarding the design of individual visual objects and the design of the visual pages should be stored by the web server. This allows the user to create data visualization that can be viewed by any other user with the necessary access privileges at the web server. The RIA interacts with the web server to store and retrieve documents stored in a format such as XML. The transmission of this information may be performed either through an existing real-time data connection or using a separate HTTP connection. A built-in web server within the data server simplifies the implementation of this transmission, but is not necessary.

Figure 8:
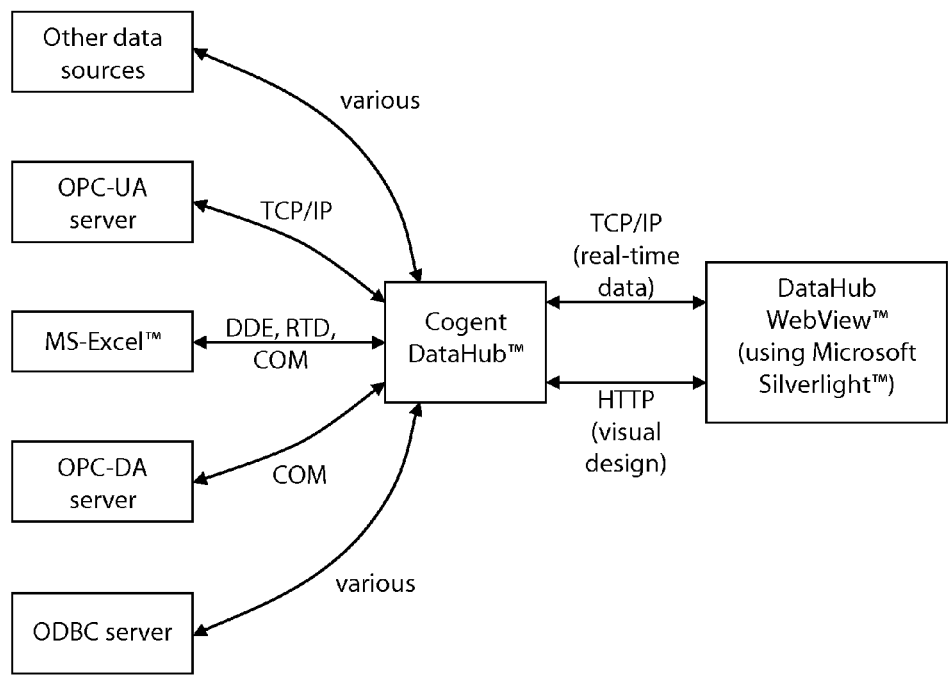
FIG. 8 is an exemplary block diagram illustrating a system implementation, in accordance with one embodiment of the invention.

In one embodiment of the invention, a system implementing the methods of the invention comprises the following software applications:
1. Cogent DataHub™ (Cogent Real-Time Systems Inc.) acting as the data server
2. Cogent DataHub (Cogent Real-Time Systems Inc.) acting as the web server
3. Microsoft Silverlight (Microsoft Corp.) acting as the RIA framework
4. DataHub API for .Net (Cogent Real-Time Systems Inc.) acting as a protocol implementation layer for Microsoft Silverlight
5. DataHub WebView™ (Cogent Real-Time Systems Inc.) acting as a RIA for display of real-time data in a web browser
6. DataHub WebView (Cogent Real-Time Systems Inc.) acting as a display editor for visual object and page design In addition, Cogent DataHub may send and receive data from a variety of data sources, including:
1. Microsoft Excel™ (Microsoft Corp.) acting as a spreadsheet application
2. OPC-DA server (various manufacturers) acting as a data communication interface
3. OPC-UA server (various manufacturers) acting as a data communication interface
4. OPC Xi server (various manufacturers) acting as a data communication interface
5. ODBC server (various manufacturers) acting as a database interface Referring to FIG. 8, in one embodiment, depending on the particular implementation, zero or more data sources are attached to the Cogent DataHub.

In alternate embodiments of the invention, the RIA framework may be any RIA framework capable of supporting a persistent network connection. Examples of alternate such RIA frameworks include Adobe Flash™ and Adobe Flex™. It is appreciated that other RIA frameworks may also be suitable.

The RIA may be any application created using the RIA framework that can consume or produce data using the server's TCP/IP communication protocol.

The RIA framework could be integral to the web browser, as would be the case, for example, if HTML5 supported the necessary TCP communication mechanism.

The data server may be any application designed to collect data from a data source or act as a data source itself, as long as it also supplies a TCP/IP communication method that can be accessed by a constructed RIA.

A data source may be any application or system capable of producing real-time data that can be converted into a format suitable for representation within the server.

A data source may also be any application or system capable of producing non-real-time data that can be converted into a format suitable for representation within the server. The server can poll this data repeatedly or collect it by subscription to provide the data to a RIA even in the case that the original data is not real-time. For example, a database management system (DBMS) is generally not real-time, but the data can be polled repeatedly to create a periodically updating data set within the server, thus supplying a RIA with a pseudo-real-time view of the data within the DBMS.

The server and the data source may be combined into a single application, as may be the case with an OPC-UA server, or with an embedded device that offers access to its data via a TCP/IP connection.

The web server may be any application capable of serving the web page containing the RIA.

A program developed using any compiled or interpreted computer language that can open and interact with a TCP/IP socket may be used in place of a RIA, which may or may not run within a web browser. Similarly, the methods of the present invention may also be implemented using code executable directly in a browser, in an out-of-browser host, or through an extension of the browser, in place of a RIA, such that the browser, out-of-browser host, or browser extension can open and interact with a TCP/IP socket, make a persistent network connection and, optionally, offer graphical capabilities.

What is claimed is:

1. A method of providing real-time data to a Rich Internet Application (RIA), the method comprising:
    providing first real-time data from a data source;
    propagating the first real-time data from the data source to a server;
    collecting the first real-time data at the server;
    creating a first persistent connection from the server to a first RIA;
    subscribing the first RIA to the first real-time data, wherein at least some of the first real-time data is propagated to the first RIA through the first persistent connection;
    creating a visual representation of at least some of the first real-time data at the first RIA,
    producing second real-time data at the first RIA, wherein said second real-time data is created in response to the visual representation;
    creating a second persistent connection from the first RIA to the server;
    propagating at least some of the second real-time data from the first RIA to the server through the second persistent connection; and
    propagating at least some of the second real-time data to a second RIA connected to the server,
    wherein the first and second real-time data satisfy an application-dependent latency requirement for data delivery.

2. The method of claim 1, further comprising propagating the first real-time data from the server to a data sink.

3. The method of claim 1, wherein the first persistent connection and the second persistent connection consist of one connection.

4. The method of claim 1, wherein the data source, data sink and server consist of at least one component.

5. The method of claim 1, wherein the first real-time data is propagated through at least one intermediate selected from the group comprising: a software component, a hardware component, and a network.

6. The method of claim 1, wherein a data item is propagated between the first RIA and the server on a subscription basis, and wherein the data item is propagated immediately in response to a change in the data item.

7. The method of claim 1, wherein the first and second real-time data are selected from the group comprising: numeric data, non-numeric data, configuration settings and executable commands.

8. The method of claim 1, wherein the first RIA performs an action based upon the first real-time data, where the action is selected from the group comprising: a modification of the visual representation, a calculation, production of new data, modification of existing data, storage of data, an audible indication, execution of a script, propagation of data to the server, a user-visible programmatic response, and a non-user-visible programmatic response.

9. The method of claim 1, wherein the second real-time data produced at the first RIA instructs the server to perform an action selected from the group comprising: modification of data within the server, propagation of the data to data sinks connected to the server, execution of a script, storage of the data to a file system, creation of new data, propagation of new data to data sinks connected to the server, modification of a server configuration, modification of a server behaviour, a user-visible programmatic response, and a non-user-visible programmatic response.

10. A computer system for providing real-time data to a Rich Internet Application (RIA), the system comprising:
at least one computer;
at least one data source;
at least one server comprising:
a data collection component for collecting first real-time data from the at least one data source; and
a data emission component for emitting the first real-time data to at least one data client; and
a plurality of RIAs, wherein a first RIA and a second RIA are implemented in an RIA framework comprising support for:
presenting a graphical display;
making a first long-lived TCP/IP data connection to the server to receive data;
receiving at least some of the first real-time data from the server;
creating in the graphical display a visual representation of at least some of the first real-time data at the first RIA,
producing second real-time data at the first RIA, wherein said second real-time data is created in response to the visual representation;
transmitting the second real-time data to the server over a second long-lived TCP/IP data connection, and
propagating at least some of the second real-time data to the second RIA,
wherein one of the at least one server is adapted to run on one of the at least one computer, wherein the first real-time data is received from the server by subscription, and wherein the first and second real-time data satisfy an application-dependent latency requirement for data delivery.

11. The system of claim 10, further comprising at least one data sink.

12. The system of claim 10, wherein the at least one server further comprises a data modification component for modifying the form of the first real-time data collected by the data collection component for emission by the data emission component.

13. The system of claim 10, wherein the at least one server further comprises at least one component selected from the group consisting of: a data modification component; a data creation component; a user interface component; a computer file system interaction component; a program interaction component; a scripting language component to perform programmable actions; a HTTP component for accepting HTTP requests; a synchronization component to exchange and synchronize data; a first throttling component to limit the rate at which data is collected; a second throttling component to limit the rate at which data is emitted; a connectivity component to detect a loss of connectivity to other servers, and to reconnect to the other servers when connectivity is regained; a redundancy component to redundantly connect to multiple other servers of identical or similar information; and a bridging component for moving data among a plurality of data sources.

14. The system of claim 10, wherein the data collection component collects data in at least one manner selected from the group consisting of: on demand, by subscription, on a trigger, and passively.

15. The system of claim 10, wherein the data emission component emits data in at least one manner selected from the group consisting of on demand, by subscription, and on a trigger.

16. The system of claim 10, wherein the at least one data source and the at least one server are implemented in at least one computer program.

17. The system of claim 10, wherein the first TCP/IP data connection and the second TCP/IP data connection consist of one connection.

18. The system of claim 10, wherein the graphical display comprises at least one graphical element, wherein the at least one graphical element is a customized graphical element, wherein the customized graphical element is customizable by a programmer, and wherein the customization is without modification to an application implemented in the RIA framework.

19. A computer readable memory storing instructions that, when executed on one or more computers, causes the computers to perform a method of providing real-time data to a Rich Internet Application (RIA), the method comprising:
providing first real-time data from a data source;
propagating the first real-time data from the data source to a server;
collecting the first real-time data at the server;
creating a first persistent connection from the server to a first RIA;
subscribing the first RIA to the first real-time data, wherein at least some of the first real-time data is propagated to the first RIA through the first persistent connection;
creating a visual representation of at least some of the first real-time data at the first RIA,
producing second real-time data at the first RIA, wherein said second real-time data is created in response to the visual representation;
creating a second persistent connection from the first RIA to the server;
propagating at least some of the second real-time data from the first RIA to the server through the second persistent connection; and
propagating at least some of the second real-time data to a second RIA connected to the server,
wherein the first and second real-time data satisfy an application-dependent latency requirement for data delivery.

* * * * *